(12) United States Patent
Park et al.

(10) Patent No.: US 12,223,576 B2
(45) Date of Patent: Feb. 11, 2025

(54) APPARATUS AND METHOD FOR CREATING AVATAR

(71) Applicant: illuni Inc., Seoul (KR)

(72) Inventors: Byung Hwa Park, Seoul (KR); Jae Wang Lee, Seoul (KR); Gabee Jo, Goyang-si (KR); Ho Jeong Shin, Osan-si (KR); Kun Sang Jung, Seoul (KR)

(73) Assignee: illuni Inc., Seoul (KR)

( * ) Notice: Subject to any disclaimer, the term of this patent is extended or adjusted under 35 U.S.C. 154(b) by 175 days.

(21) Appl. No.: 18/071,640

(22) Filed: Nov. 30, 2022

(65) Prior Publication Data
US 2024/0177389 A1 May 30, 2024

(30) Foreign Application Priority Data
Nov. 29, 2022 (KR) .................. 10-2022-0162392

(51) Int. Cl.
G06T 13/40 (2011.01)
G06T 19/20 (2011.01)

(52) U.S. Cl.
CPC .............. G06T 13/40 (2013.01); G06T 19/20 (2013.01); G06T 2219/2016 (2013.01); G06T 2219/2021 (2013.01)

(58) Field of Classification Search
CPC . G06T 13/40; G06T 19/20; G06T 2219/2016; G06T 2219/2021
See application file for complete search history.

(56) References Cited

U.S. PATENT DOCUMENTS

| 6,504,546 | B1 | 1/2003 | Cosatto et al. | |
|---|---|---|---|---|
| 2012/0079378 | A1* | 3/2012 | Goossens | G06T 17/10 715/849 |
| 2016/0134840 | A1* | 5/2016 | McCulloch | G06V 40/165 348/14.03 |
| 2016/0217601 | A1* | 7/2016 | Tsuda | G06T 13/80 |
| 2017/0161948 | A1* | 6/2017 | Hua | A41H 1/02 |
| 2020/0306640 | A1* | 10/2020 | Kolen | A63F 13/67 |
| 2022/0375150 | A1 | 11/2022 | Guo | |

FOREIGN PATENT DOCUMENTS

| GB | 2351426 A | * 12/2000 | ............. G06T 17/00 |
|---|---|---|---|
| KR | 10-2020-0019297 A | 2/2020 | |
| KR | 10-2020-0139240 A | 12/2020 | |
| KR | 10-2021-0123399 A | 10/2021 | |
| KR | 10-2022-0049689 A | 4/2022 | |
| KR | 10-2022-0080576 A | 6/2022 | |

OTHER PUBLICATIONS

Switch Force, Nintendo Switch Mii Creation + NEW Mii Options and Poses, Feb. 23, 2017, YouTube, https://www.youtube.com/watch?v=n4ZFuaf2k4M (Year: 2017).*

* cited by examiner

Primary Examiner — King Y Poon
Assistant Examiner — Nayana Yeshlur
(74) Attorney, Agent, or Firm — Nicholas Park

(57) ABSTRACT

Disclosed is an avatar creation method including creating a base object of an avatar, creating at least one partial object; acquiring customizing information of a user, deforming the base object and the at least one partial object based on the customizing information; and creating a user avatar with a default facial expression by projecting the at least one partial object onto the surface of the base object.

14 Claims, 20 Drawing Sheets

APPARATUS AND METHOD FOR CREATING AVATAR

CROSS-REFERENCE TO RELATED APPLICATION

This application claims priority from and the benefit of Korean Patent Application No. 10-2022-0162392 filed on Nov. 29, 2022, which is hereby incorporated by reference in its entirety.

BACKGROUND

Technical Field

The present disclosure of the following description relates to an avatar creation apparatus and method, and more particularly, to an avatar creation apparatus and method that allows a user to customize a three-dimensional (3D) avatar with a high degree of freedom.

Related Art

An avatar refers to a visual object used like an alter ego of a user in cyberspace and also refers to a graphic character expressed in cyberspace. With the spread of augmented reality (AR), virtual reality (VR), Mixed reality (MR), and metaverse services and with growth of related markets, the number of cases of using avatars is increasing.

As an expectation of users increases, the users desire to use avatars customized by themselves rather than using predetermined avatars.

For examples, users desire to customize a face shape, eyes, nose, a shape of mouth, a hair color, etc., of an avatar by themselves. In particular, a face of the avatar is more curved than other body portions and persons may easily perceive a difference even with a subtle change. Due to such a reason, it is technically not easy to provide an environment in which a user may readily customize the face of the avatar.

Although a current commercialized avatar providing service provides a three-dimensional (3D) avatar customizing function, a difference between avatars created by users may not be noticeable due to a relatively low degree of freedom of customizing. In the case of an avatar system that allows a user to create an avatar as if the user draws a picture, a facial expression of the avatar is limited to a finite number of categories and the facial expression of the avatar is not abundantly provided.

A reference material includes Korean Patent Laid-Open Publication No. 10-2022-0080576.

SUMMARY

At least one example embodiment provides an avatar creation method and apparatus that allows a user to customize a three-dimensional (3D) avatar.

Technical objects set forth herein are not limited to the aforementioned technical objects and other technical objects not described herein may be clearly understood by one of ordinary skill in the art from the following description.

According to an aspect of at least one example embodiment, there is provided an avatar creation method including creating a base object of an avatar; creating at least one partial object; acquiring customizing information of a user; deforming the base object and the at least one partial object based on the customizing information; and creating a user avatar with a default facial expression by projecting the at least one partial object onto the surface of the base object.

The deforming the base object and the at least one partial object comprises: deforming information of the base object included in a grid space through deformation of at least one of a plurality of grid spaces that constitutes the base object based on first customizing information on the base object; and deforming information of the at least one partial object included in a grid space through deformation of at least one of a plurality of grid spaces that constitutes the at least one partial object based on second customizing information on the at least one partial object.

The deforming the base object and the at least one partial object further comprises changing at least one of a thickness, a color, a texture, and smoothing of the at least one partial object based on the second customizing information on the at least one partial object.

A change in a location of a vertex associated with configuration information of the base object accompanies deformation of a partial object associated with the vertex of which the location is changed.

Deformation of at least one of the plurality of grid spaces that constitutes the base object accompanies deformation of a grid space of a partial object associated with the deformation of the grid space of the base object such that the base object and the partial object are deformed together.

The at least one partial object is projected onto the surface of the base object in a predetermined one direction.

The at least one partial object is projected in a normal vector direction of the surface of the base object at a location at which the at least one partial object is projected onto the surface of the base object.

The avatar creation method may further include acquiring a captured face image of the user, wherein the base object and the at least one partial object of the avatar are created based on feature information acquired from the captured face image of the user.

The feature information acquired from the captured face image of the user includes at least one of a face shape of the user, a skin tone of the user, a hair style of the user, a hair color of the user, an eye size of the user, an eye color of the user, gender of the user, age of the user, a type and a shape of accessory, and a racial characteristic of the user.

The avatar creation method may further include changing a facial expression of the user avatar, wherein the changing the facial expression of the user avatar comprises: extracting a transformation relationship between the user avatar with the default facial expression and a prepared reference avatar with a default facial expression; creating the user avatar for each of a plurality of reference facial expressions from the reference avatar prepared for each of the plurality of reference facial expressions based on the transformation relationship; and changing the facial expression of the user avatar by combining the user avatar with the default facial expression and the user avatar created for each of the plurality of reference facial expressions.

The extracting the transformation relationship comprises extracting a first transformation relationship between a base object of the user avatar and a base object of the reference avatar from the default facial expression; and extracting a second transformation relationship between at least one partial object of the user avatar and a partial object of the reference avatar from the default facial expression, and the creating the user avatar for each of the plurality of reference facial expressions comprises: creating the base object of the user avatar for each of the plurality of reference facial expressions from the base object of the reference avatar prepared for each of the plurality of reference facial expressions based on the first transformation relationship; and creating the partial object of the user avatar for each of the plurality of reference facial expressions from the base object of the reference avatar prepared for each of the plurality of reference facial expressions based on the second transformation relationship.

The changing the facial expression of the user avatar comprises: acquiring speech information of the user; determining a combination weight of each of the plurality of reference facial expressions based on the speech information of the user; and combining the user avatar with the default facial expression and the user avatar created for each of the plurality of reference facial expressions based on the combination weight.

A combination weight of the user avatar created for each of the plurality of reference facial expressions is expressed as a time-series weight sequence, and a facial expression of the user avatar is animated based on the time-series weight sequence.

The avatar creation method further comprising: providing the user avatar as three-dimensional (3D) printing data.

According to at least one example embodiment, since an avatar creation apparatus manages each of a base object and partial objects of an avatar as a 3D graphics model, a degree of freedom with which a user may customize the avatar may increase. Also, a shape of the avatar in which the base object and the partial objects are combined may be more natural than before. According to at least one example embodiment, a user may create a substantially infinite number of facial expressions of an avatar. According to at least one example embodiment, a facial expression of a user avatar may become natural. According to at least one example embodiment, it is possible to acquire speech information of a user and to create a facial expression of a user avatar based on the speech information of the user. According to at least one example embodiment, since a facial expression of a user avatar is animated based on speech information of a user, the user avatar may be more realistically expressed in a virtual space. According to at least one example embodiment, a user avatar may be customized by applying an appearance feature of a user based on a captured image of the user.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Various aspects are described with reference to the accompanying drawings and, herein, like reference numerals refer to like elements throughout. In the following example embodiments, numerous specific details are set forth herein to provide thorough understanding of at least one aspect for the purpose of explanation. However, it will be apparent that such aspect(s) may be practiced without the specific details. In other examples, known structures and devices are illustrated in a form of a block diagram to easily describe at least one aspect.

DETAILED DESCRIPTION

Figure 1:
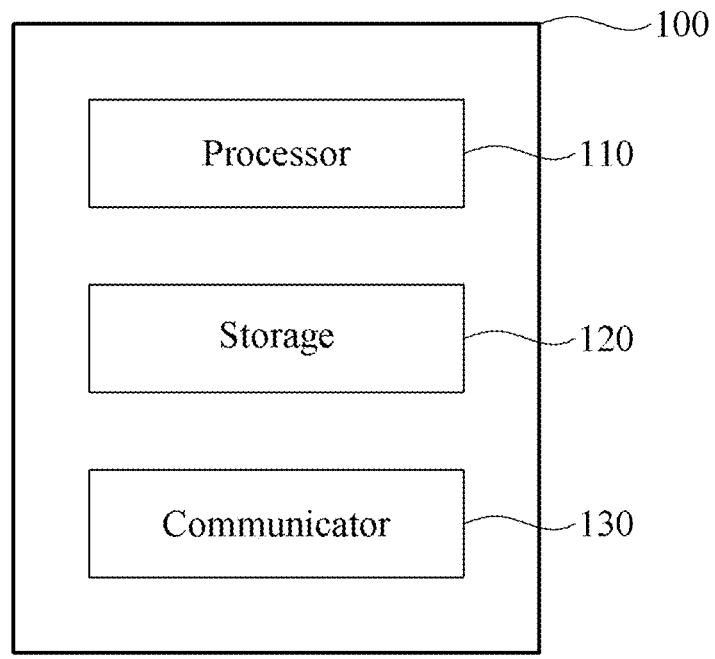
FIG. 1 is a diagram illustrating an example of an avatar creation apparatus according to an example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure. Like reference numerals refer to like elements throughout to describe each drawing.

Although the terms "first," "second," "A," "B." etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "accessed to" another component, the component may be directly connected to or accessed to the other component, or one or more other intervening components may be present. In contrast, when a component is referred to as being "directly connected to" or "directly accessed to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising (incudes/including)," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms including technical and scientific terms used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, an avatar creation method and apparatus according to example embodiments will be described with reference to FIGS. 1 to 16.

FIG. 1 is a diagram illustrating an example of an avatar creation apparatus 100 according to an example embodiment. Referring to FIG. 1, the avatar creation apparatus 100 may include a processor 110, a storage 120, and a communicator 130. Here, the components are not essential to implement the avatar creation apparatus 100 and the avatar creation apparatus 100 may include a greater or smaller number of components than a number of the listed components.

The avatar creation apparatus 100 may include, for example, a microprocessor, a mainframe computer, a digital processor, and an arbitrary type of a computer system or a computer device, such as a portable device or a device controller.

The avatar creation apparatus 100 may achieve desired system performance using a combination of typical computer hardware (e.g., a device that may include a computer processor, a memory, a storage, an input device and an output device, and components of other existing computing devices; an electronic communication device such as a router, a switch, etc.; an electronic information storage system such as a network-attached storage (NAS) and a storage area network (SAN)), and computer software (i.e., instructions that allow a computing device to operate in a specific manner).

The processor 110 may typically process an overall operation of the avatar creation apparatus 100. The processor 110 may provide a signal, data, information, etc., input or output through the components of the avatar creation apparatus 100, or may provide or process information or a function suitable for a user by running an application program stored in the storage 120.

The processor 110 may include at least one core, and may include a processor for data analysis, such as a central processing unit (CPU), a general purpose graphics processing unit (GPGPU), a tensor processing unit (TPU), and the like.

The storage 120 may include a memory and/or a permanent storage medium. The memory may include at least one of a flash memory type, a hard disk type, a multimedia card micro type, a card type memory (e.g., an SD or an XD memory), random access memory (RAM), static random access memory (SRAM), read-only memory (ROM), electrically erasable programmable read-only memory (EEPROM), programmable read-only memory (PROM), magnetic memory, magnetic disk, and an optical disc.

The communicator 130 may include at least one module that enables communication between the avatar creation apparatus 100 and a communication system, between the avatar creation apparatus 100 and another mobile device, or between the avatar creation apparatus 100 and a network.

The avatar creation apparatus 100 may include a personal computer (PC), a laptop computer, a mobile terminal, a smartphone, a tablet PC, etc., owned by the user, and may include any type of terminals accessible to a wired/wireless network. Alternatively, the avatar creation apparatus 100 may achieve desired system performance using a combination of typical computer hardware (e.g., a device that may include a computer processor, a memory, a storage, an input device and an output device, and components of other existing computing devices; an electronic communication device, such as a router, a switch, etc.; an electronic information storage system such as a NAS and a SAN), and a computer software (i.e., instructions that allow a computing device to operate in a specific manner).

Hereinafter, a method of creating, by the avatar creation apparatus 100, an avatar is described.

Figure 2:
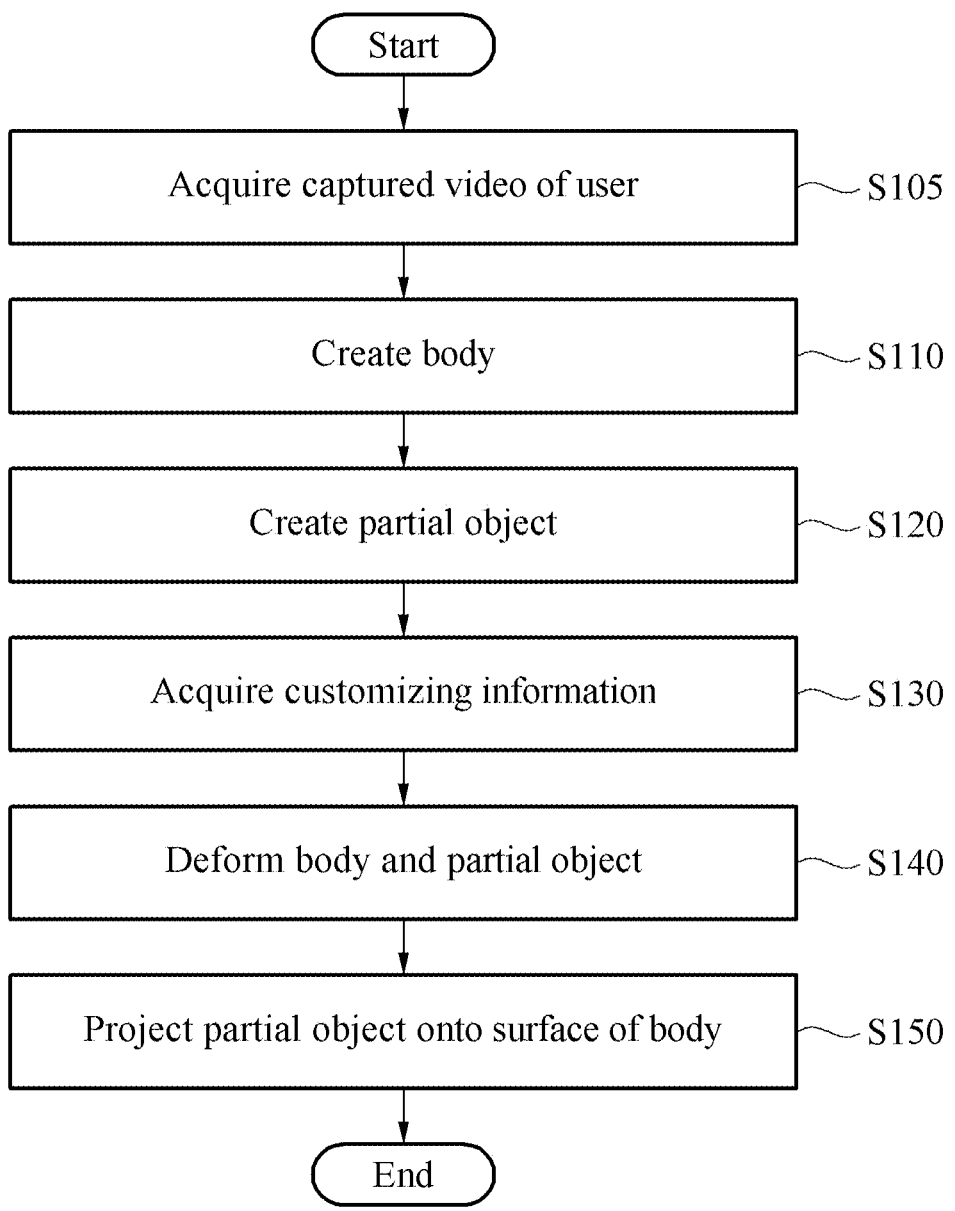
FIG. 2 is a flowchart illustrating an example of an avatar creation method according to an example embodiment.

FIG. 2 is a flowchart illustrating an example of an avatar creation method according to an example embodiment. Referring to FIG. 2, in operation S105, the avatar creation apparatus 100 may acquire a captured video of a user. Here, the captured video may include at least one of a captured image or a moving picture. The avatar creation apparatus 100 may acquire information on at least one of a face shape of the user, skin tone of the user, a hair color of the user, an eye size of the user, an eye color of the user, gender of the user, and age of the user from the captured video of the user. The avatar creation apparatus 100 may create an avatar based on the acquired feature information of the user. For example, the avatar creation apparatus 100 may determine a ratio between a head and a base object of the avatar based on age of the user. The avatar creation apparatus 100 may determine a hair color and skin tone of the avatar based on hair color and skin tone of the user. The avatar creation apparatus 100 may extract a feature about appearance of the user from the captured video of the user and may create a base object and a partial object of the avatar based on the extracted appearance feature. The avatar creation apparatus 100 may extract customizing information on the user avatar based on the appearance feature of the user. For example, the avatar creation apparatus 100 may determine a face shape of the user avatar based on the face shape of the user.

Depending on example embodiments, operation S105 may be omitted. For example, the avatar creation apparatus 100 may create the base object and the partial objects of the avatar based on appearance option information set by the user.

In operation S1101, the avatar creation apparatus 100 may create a base object of an avatar (also, referred to as an avatar base object). The avatar base object may be expressed as a 3D model. The avatar base object may include 3D model information that expresses a face shape, a base object skeleton, and a base object shape of the avatar. The avatar creation apparatus 100 may create the base object of the avatar based on the captured image of the user.

In operation S1201, the avatar creation apparatus 100 may create a partial object of the avatar. The avatar creation apparatus 100 may create a plurality of partial objects. The partial object may correspond to a portion that represents a feature of the avatar. For example, the partial object may correspond to one of an eye, an eyebrow, a nose, a mouth, and hair of the avatar. However, the example embodiment is not limited thereto. The partial object may represent physical base object or clothes of the avatar. The avatar creation apparatus 100 may create the partial object of the avatar based on the captured image of the user.

In operation S1301, the avatar creation apparatus 100 may acquire customizing information of the user. The avatar creation apparatus 100 may provide a predetermined user interface and may acquire customizing information based on a user interaction for the user interface. Although the user interaction may include a drag, a text input, etc., of the user, the example embodiment is not limited thereto. As another example, the avatar creation apparatus 100 may acquire appearance feature information of the user based on the captured image of the user acquired in operation S105 and may also acquire customizing information based on the acquired appearance feature information.

The customizing information may include customizing information on a shape or a form of the avatar. The customizing information may include first customizing information for the avatar base object. The first customizing information may include a command for distorting or deforming a 3D shape of the avatar base object. The first customizing information may also include settings related to a color, texture, etc., of the avatar base object.

The customizing information may include second customizing information on the partial object of the avatar. For example, when a plurality of partial objects is present, the second customizing information may include (2-1)-th customizing information on a first partial object and (2-2)-th customizing information on a second partial object. The second customizing information may include a command for distorting or deforming a 3D shape of the partial object. The second customizing information may include a command for changing a shape, a thickness, a color, texture, and smoothing of the partial object.

In operation S140, the avatar creation apparatus 100 may customize the base object and the partial object of the avatar based on the customizing information acquired in operation S130.

Figure 3:
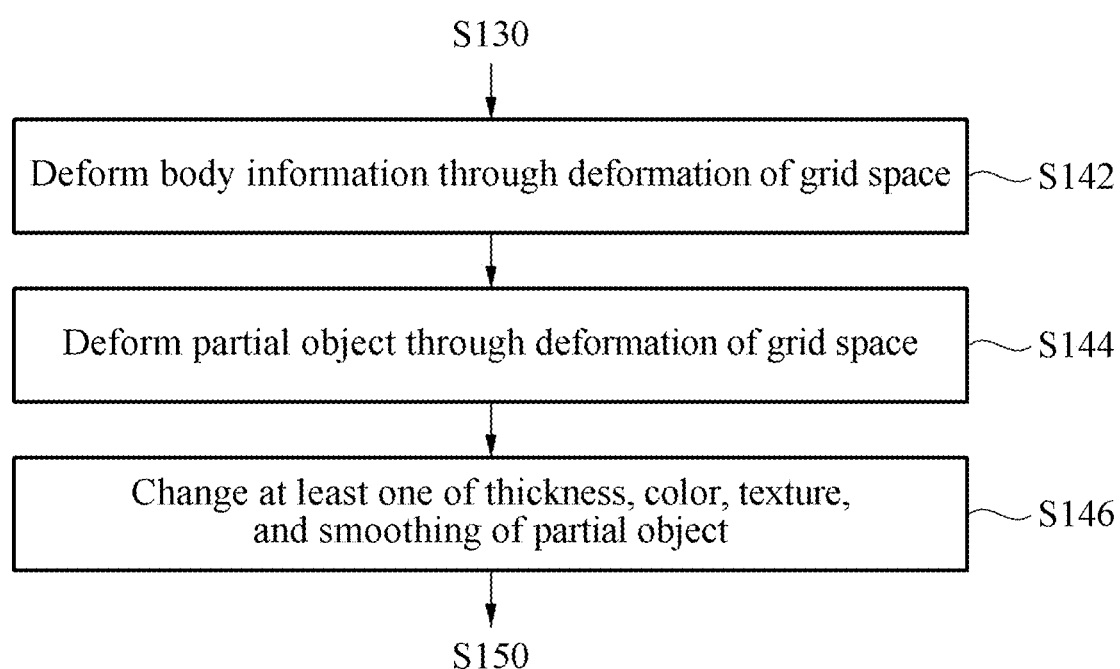
FIG. 3 is a flowchart illustrating an example of a process of performing operation S140 of FIG. 2.
Figure 4:
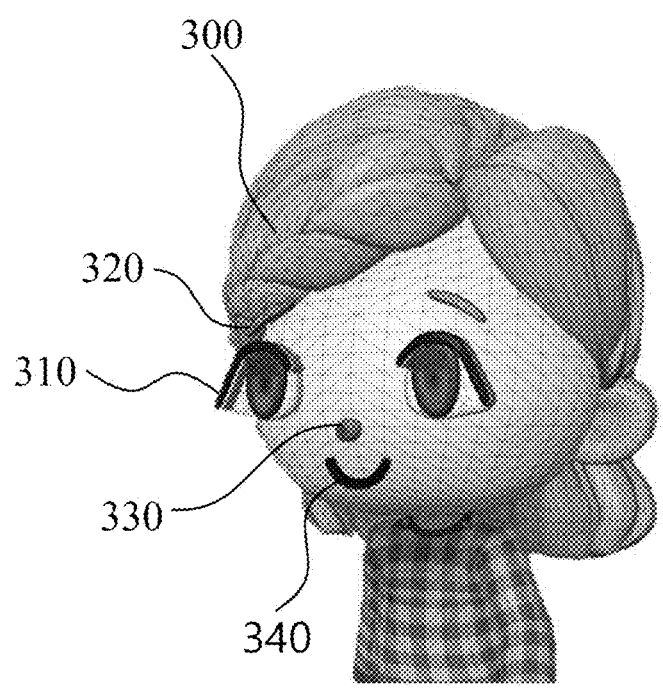
FIG. 4 illustrates an example of a base object and partial objects of a customized avatar according to an example embodiment.

FIG. 3 is a flowchart illustrating an example of a process of performing operation S140 of FIG. 2, and FIG. 4 illustrates an example of a base object and partial objects of a customized avatar according to an example embodiment.

Referring to FIGS. 3 and 4, in operation S142, the avatar creation apparatus 100 may customize a base object 300 of an avatar based on the first customizing information. The avatar creation apparatus 100 may deform a 3D shape of the base object 300 based on the first customizing information. The base object 300 may include a plurality of grid spaces. The avatar creation apparatus 100 may change a shape, a size, etc., of some grid spaces among the plurality of grid spaces that constitutes the base object 300. For example, based on the first customizing information, the avatar creation apparatus 100 may deform a shape or a form of the base object 300 using at least one of a free-form deformation (FFD) algorithm and 3D model deformation algorithms available by one of ordinary skill in the art, based on the first customizing information. The avatar creation apparatus 100 may deform at least one grid space among the grid spaces that constitute the base object 300. As the grid space is deformed, information of the base object 300 included in the grid space may be deformed. Here, the grid space refers to information that represents a space occupied by the base object 300 with a deformable shape and an interface for receiving an input of the user expressed for the user may be treated or managed differently from the grid space.

In operation S144, the avatar creation apparatus 100 may deform a 3D shape of at least one partial object based on the second customizing information. Here, the second customizing information may include a command for customizing a first partial object 310 corresponding to an eye, a command for customizing a second partial object 320 corresponding to an eyebrow, a command for customizing a third partial object 330 corresponding to nose, and a command for customizing a fourth partial object 340 corresponding to mouth. The avatar creation apparatus 100 may customize each of the partial objects 310, 320, 330, and 340. For example, the avatar creation apparatus 300 may deform at least one grid space among grid spaces that constitutes the first partial object 310. The avatar creation apparatus 300 may deform information of the first partial object 310 included in the corresponding grid space by deforming at least one grid space. Such partial objects are not limited to the aforementioned eye, eyebrow, nose, and mouth and may include an arbitrary object that may be projected onto a face of an avatar base object, such as accessories, wrinkles, and the like.

In operation S146, the avatar creation apparatus 100 may deform at least one of the partial objects 310, 320, 330, and 340 based on a portion of the second customizing information. For example, the avatar creation apparatus 100 may change a shape, a thickness, color, texture, smoothing, and the like of the first partial object 310.

Figure 5:
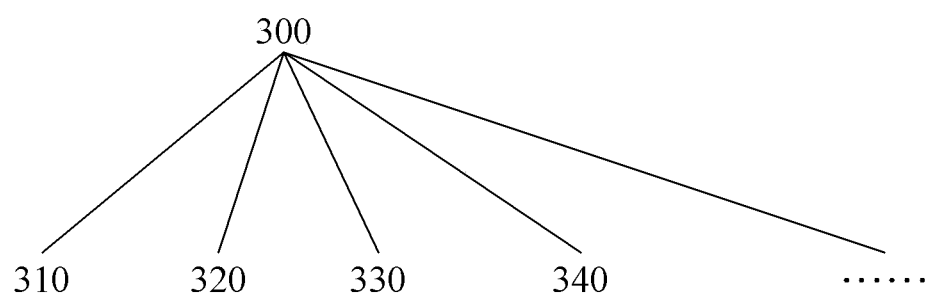
FIG. 5 illustrates an example of a relationship between a base object and partial objects that constitute an avatar according to an example embodiment.

FIG. 5 illustrates an example of a relationship between the base object 300 and the partial objects 310, 320, 330, and 340 that constitute the avatar according to an example embodiment.

Referring to FIG. 5, the base object 300 and the partial objects 310, 320, 330, and 340 may be hierarchically related. The base object 300 may have a higher class than the partial objects 310, 320, 330, and 340. Therefore, when a portion of attributes of the base object 300 is changed, a portion of the partial objects 310, 320, 330, and 340 may be changed. For example, if a distance between vertices of a location at which the first partial object 310 corresponding to the eye in the base object 300 is projected changes in response to a change in a shape of the base object 300, a size or a width of the first partial object 310 may also change. As the base object 300 changes, the grid space of the base object 300 corresponds to the changed information and grid spaces of the partial objects 310, 320, 330, and 340 may change correspondingly and shapes of the partial objects 310, 320, 330, and 340 may change. Information of the partial object 310 may correspond to information of the base object 300 and change together. At the same time, the partial object 310 may be continuously projected onto the base object 300. Through this, the avatar of the user may maintain a natural appearance. In contrast, the partial objects 310, 320, 330, and 340 may have a lower class than that of the base object 300. Even a change in attributes of the partial objects 310, 320, 330, and 340 may not affect the base object 300. Through this, a degree of freedom with which the user may change the partial objects 310, 320, 330, and 340 projected onto the base object 300 may increase.

The aforementioned example embodiment is provided as an example only and the disclosure is not limited thereto. Each of the partial objects 310, 320, 330, and 340 may be associated with an object with a lower class than itself. For example, the first partial object 310 corresponding to the eye may include a subclass object that represents an eyelash. Also, in another example embodiment, the base object 300 and the partial objects 310, 320, 330, and 340 may have classes with the same level and may form a parallel relationship.

Figure 6:
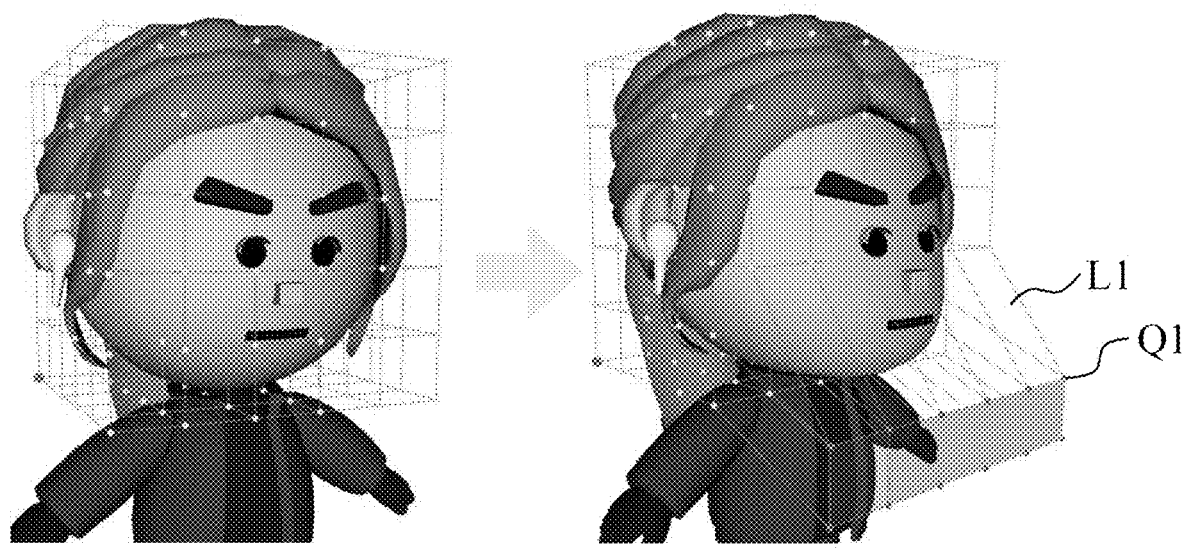
FIG. 6 illustrates an example of customizing a base object of an avatar according to an example embodiment.

FIG. 6 illustrates an example of customizing a base object of an avatar according to an example embodiment.

Referring to FIG. 6, first customizing information may include a drag command for a reference point Q1. The avatar creation apparatus 100 may deform a grid space L1 that constitutes the base object according to a change in a location of the reference point Q1. As the grid space L1 is deformed, a shape of the base object in the grid space L1 may be deformed. As the shape of the base object changes, shapes of partial objects, such as a nose, a mouth, a hat, glasses, etc., associated with attributes of the base object may also change.

According to the aforementioned example embodiment, the avatar creation apparatus 100 may perform customizing on each of the base object and the partial object. However, the disclosure is not limited thereto. For example, the avatar creation apparatus 100 may regard an object in which the base object and the partial object are combined as a single object and may also perform customizing on the corresponding object.

Figure 7A:
FIGS. 7A, 7B, 7C, and 7D illustrate examples of customizing partial objects according to an example embodiment.
Figure 7B:
Figure 7C:
Figure 7D:

FIGS. 7A, 7B, 7C and 7D illustrate examples of customizing partial objects according to an example embodiment;

Referring to FIGS. 7A and 7B, a partial object corresponding to an eye of a user avatar may be deformed compared to FIG. 7A. For example, a size, a 3D shape, and the like of the partial object corresponding to the eye of the user avatar may be changed through customizing. Also, a texture, smoothing, a thickness, and the like of the eye may be changed through customizing. Also, a size and a 3D shape of an eyelash that is a subclass object included in the eye may be changed through customizing. As another example, referring to FIG. 7D, a partial object corresponding to the eyelash of the user may be changed. For example, an arrangement angle, a size, a 3D shape, a texture, smoothing, and a thickness of the partial object corresponding to the eyelash may be changed through customizing.

Referring again to FIG. 2, in operation S150, the avatar creation apparatus 100 may project the partial objects 310, 320, 330, and 340 onto the surface of the base object 300.

Figure 8:
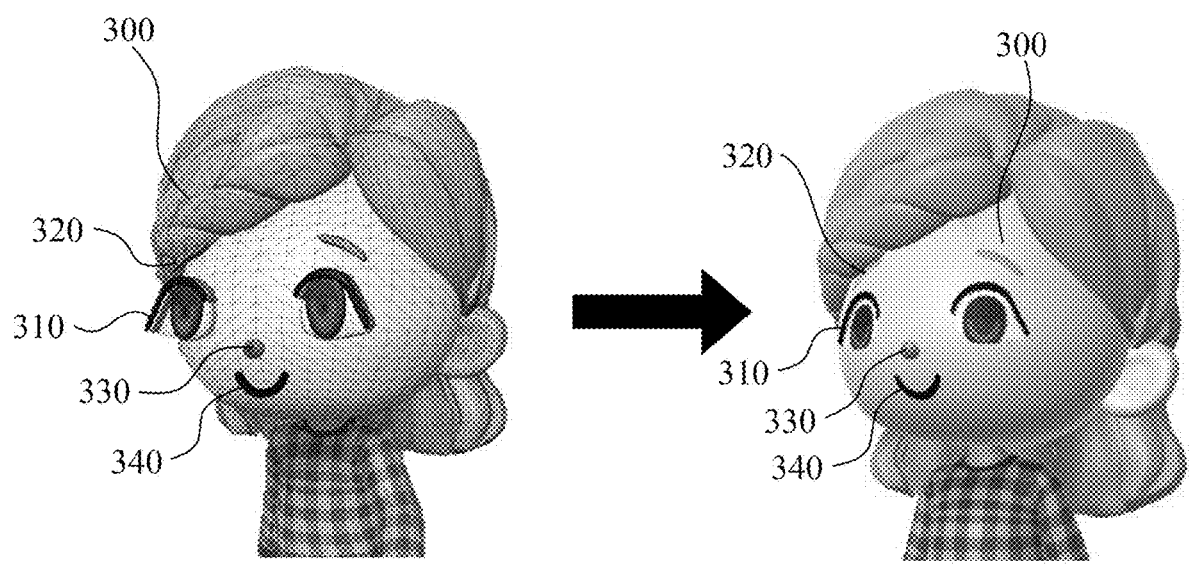
FIG. 8 illustrates an example of projecting the partial objects of FIG. 4 onto the surface of the base object.

FIG. 8 illustrates an example of projecting the partial objects 310, 320, 330, and 340 of FIG. 4 onto the surface of the base object 300.

Referring to FIG. 8, the avatar creation apparatus 100 may project the partial objects 310, 320, 330, and 340 onto the base object 300. In a projection process, the partial objects 310, 320, 330, and 340 may be combined with the base object 300 such that at least a portion of each of the partial objects 310, 320, 330, and 340 may be in contact with the base object 300. As another example, the partial objects 310, 320, 330, and 340 may be combined with the base object 300 with being spaced apart by a predetermined distance from the surface of the base object 300.

Figure 9A:
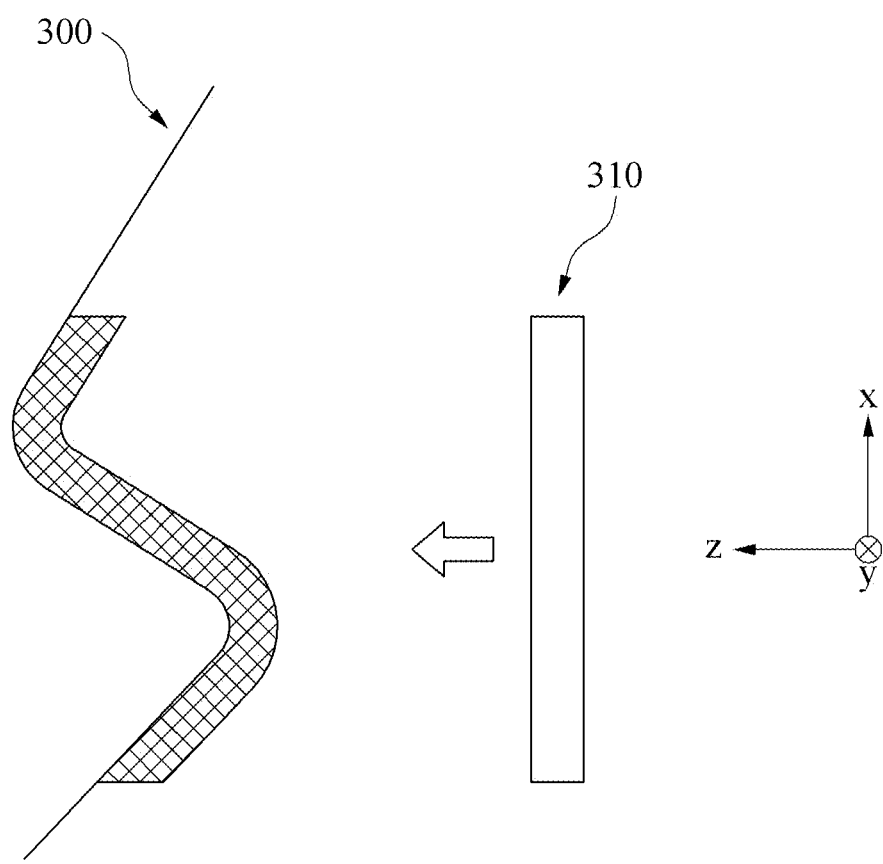
FIGS. 9A and 9B illustrate an example of a projection process according to an example embodiment.
Figure 9B:
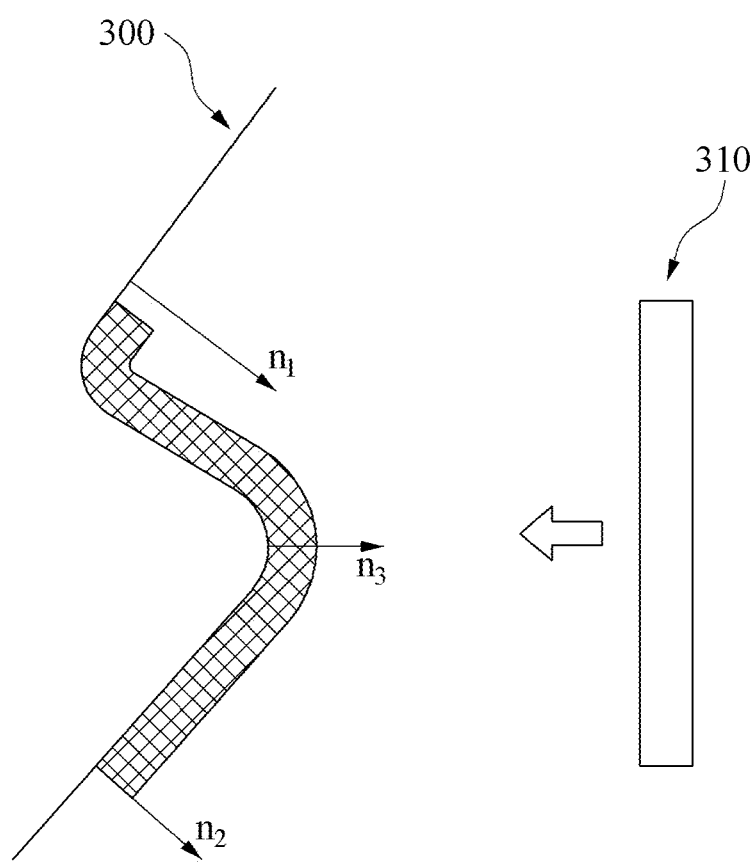

FIGS. 9A and 9B illustrate an example of a projection process according to an example embodiment.

Referring to FIG. 9A, the avatar creation apparatus 100 may project the first partial object 310 onto the base object 300. For example, the avatar creation apparatus 100 may project the first partial object 310 onto the surface of the base object 300 in a predetermined direction (e.g., a z-axis direction). In the projection process, z-axis coordinate information of the first partial object 310 may change.

Referring to FIG. 9B, the avatar creation apparatus 100 may project the first partial object 310 in a normal vector direction of the surface of the base object 300. For example, the avatar creation apparatus 100 may project the first partial object 310 in one vector (e.g., n2) direction among normal vectors (n1, n2, and n3) perpendicular to the surface at a location at which the first partial object 310 is projected. As another example, the avatar creation apparatus 100 may project an upper portion of the first partial object 310 in a direction of a first normal vector (n1), may project a lower portion of the first partial object 310 in a direction of a second normal vector (n2), and may project a middle portion of the first partial object 310 in a direction of a third normal vector (n3).

In the projection process, a Z-fighting phenomenon may occur as a portion of the partial objects 310, 320, 330, and 340 becomes very close to the surface of the base object 310. To mitigate this, the avatar creation apparatus 100 may change rendering order of the partial objects 310, 320, 330, and 340 or the base object 300.

A method of creating, by the avatar creation apparatus 100, an avatar is described above with reference to FIGS. 1 to 9. According to the example embodiments, a degree of freedom with which the user may customize the avatar may increase in such a manner that the avatar creation apparatus 100 manages each of the base object 300 and the partial objects 310, 320, 330, and 340 of the avatar as a 3D graphics model. Also, the avatar creation apparatus 100 may customize a shape and a form of each of the base object 300 and the partial objects 310, 320, 330, and 340 and then may combine the partial objects 310, 320, 330, and 340 with the base object 300 through projection. Therefore, a combined shape between the base object 300 and the partial objects 310, 320, 330, and 340 may be more natural than before. A method of combining the base object 300 and a partial object is not limited to the projection only. The partial object may be combined in such a manner that a relative distance between the partial object and the base object 300 is maintained constantly. As described above, although the partial object is combined such that the relatively distance between the partial object and the base object 300 is constant, the corresponding partial object may also be deformed when the base object 300 is deformed in a customizing process. For example, when a face corresponding to the base object 300 of the user avatar is enlarged, a partial object, such as hair, a hat, glasses, etc., combined such that the relative distance from the base object 300 of the user avatar may be maintained may also be deformed.

Hereinafter, a method of variously changing, by the avatar creation apparatus 100, a facial expression of a user avatar is described.

Figure 10:
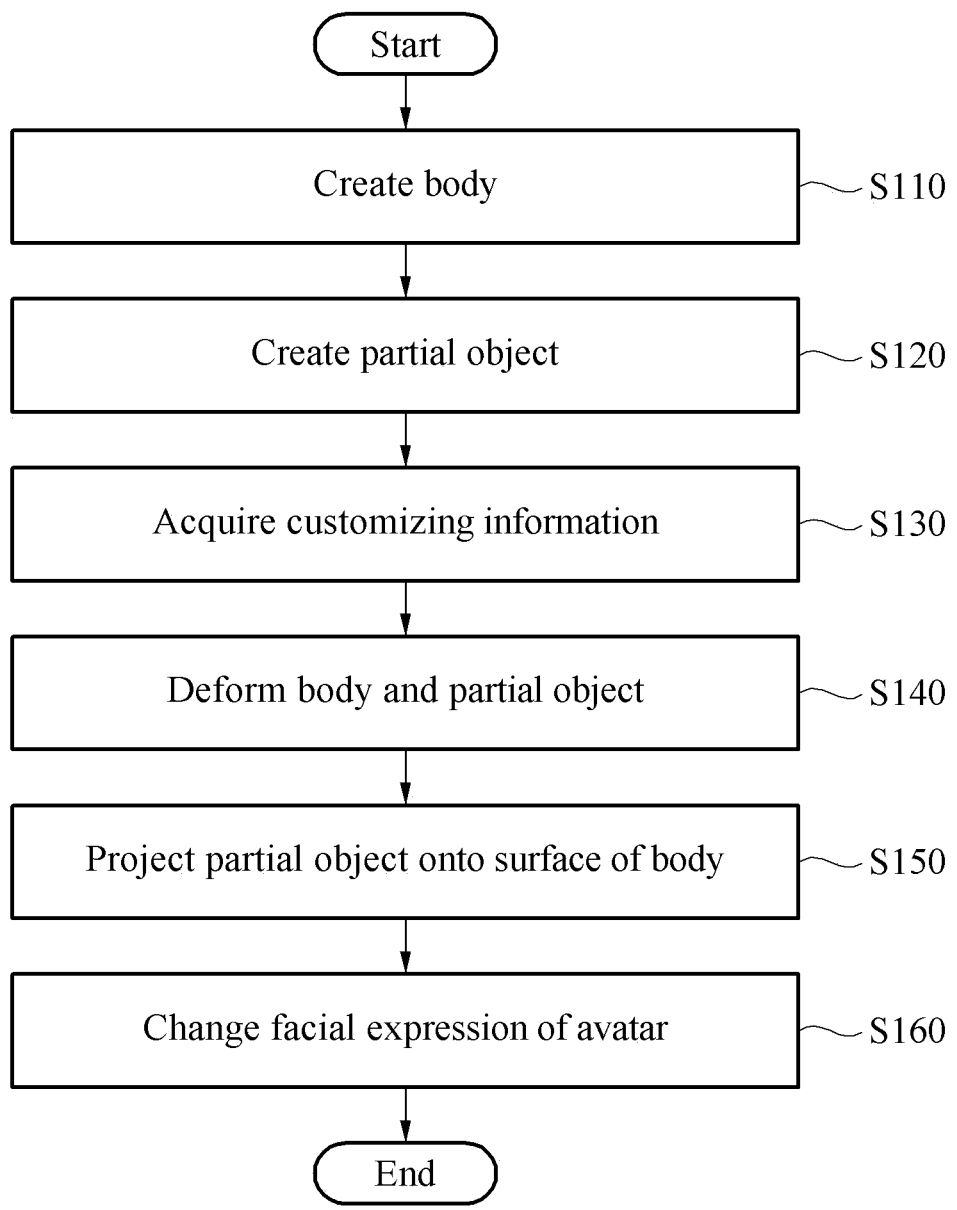
FIG. 10 is a flowchart illustrating an example of an avatar creation method according to an example embodiment.

FIG. 10 is a flowchart illustrating an example of an avatar creation method according to an example embodiment. Description related to overlapping contents of FIG. 2 is omitted in description of FIG. 10.

Referring to FIG. 10, in operation S160, the avatar creation apparatus 100 may change a facial expression of the avatar. The avatar creation apparatus 100 may create the avatar with the changed facial expression based on the user avatar with an intermediate facial expression created in operation S150.

Figure 11:
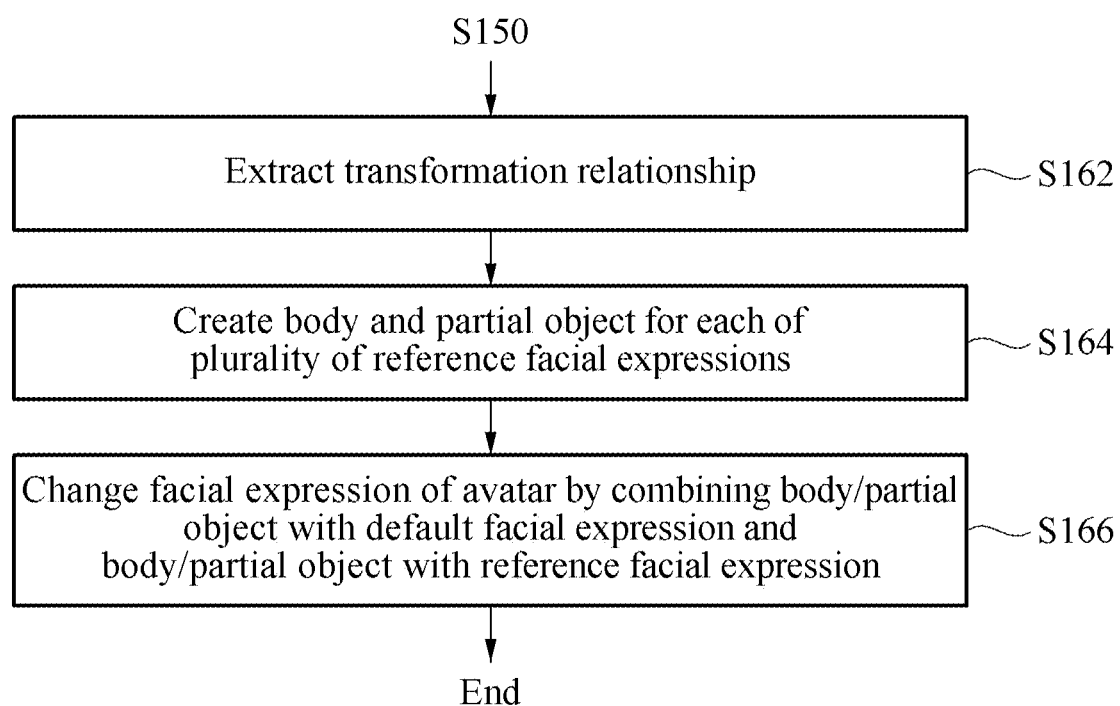
FIG. 11 is a flowchart illustrating an example of a process of performing operation S160 of FIG. 10.

FIG. 11 is a flowchart illustrating an example of a process of performing operation S160 of FIG. 10.

Referring to FIG. 11, in operation S162, the avatar creation apparatus 100 may extract a transformation relationship between the user avatar customized by the user and a prepared reference avatar. For example, in operation S150, the avatar creation apparatus 100 may create the user avatar with a default facial expression through projection of partial objects. The avatar creation apparatus 100 may compare the reference avatar with the default facial expression and the user avatar with the default facial expression created in operation S150. The avatar creation apparatus 100 may extract a transformation relationship between the reference avatar with the default facial expression and the user avatar with the default facial expression.

The avatar creation apparatus 100 may extract a transformation relationship for each of the base object and partial objects. For example, the avatar creation apparatus 100 may extract a first transformation relationship between a base object of the reference avatar with the default facial expression and a base object of the user avatar with the default facial expression. The avatar creation apparatus 100 may extract a (2-1)-th transformation relationship between a first partial object of the reference avatar with the default facial expression and a first partial object of the user avatar with the default facial expression. Likewise, the avatar creation apparatus 100 may extract a (2-2)-th transformation relationship between a second partial object of the reference avatar with the default facial expression and a second partial object of the user avatar with the default facial expression.

The avatar creation apparatus 100 may extract the first transformation relationship, the (2-1)-th transformation relationship, and the (2-2)-th transformation relationship using a deformation transfer algorithm.

In operation S164, the avatar creation apparatus 100 may create the user avatar corresponding to each of reference facial expressions from the reference avatar prepared for each of the plurality of reference facial expressions.

The plurality of reference facial expressions may correspond to facial expressions in which facial muscles are moved in a predetermined manner. For example, the plurality of reference facial expressions may be facial expressions defined by a facial action coding system (FACS). However, the example embodiment is not limited thereto. The plurality of reference facial expressions may include only a portion of the facial expressions defined by the FACS. As another example, the plurality of reference facial expressions may further include other facial expressions aside from facial expressions defined in the FACS.

The avatar creation apparatus 100 may create the base object and the partial objects of the user avatar that express each of the plurality of reference facial expressions. The avatar creation apparatus 100 may create a base object of the user avatar from a base object of the reference avatar that is prepared for each of the plurality of reference facial expressions. In this process, the avatar creation apparatus 100 may use the first transformation relationship extracted in operation S162. The avatar creation apparatus 100 may create the first partial object of the user avatar from the first partial object of the reference avatar prepared for each of the plurality of reference facial expressions. In this process, the avatar creation apparatus 100 may use the (2-1)-th transformation relationship extracted in operation S162.

Figure 12:
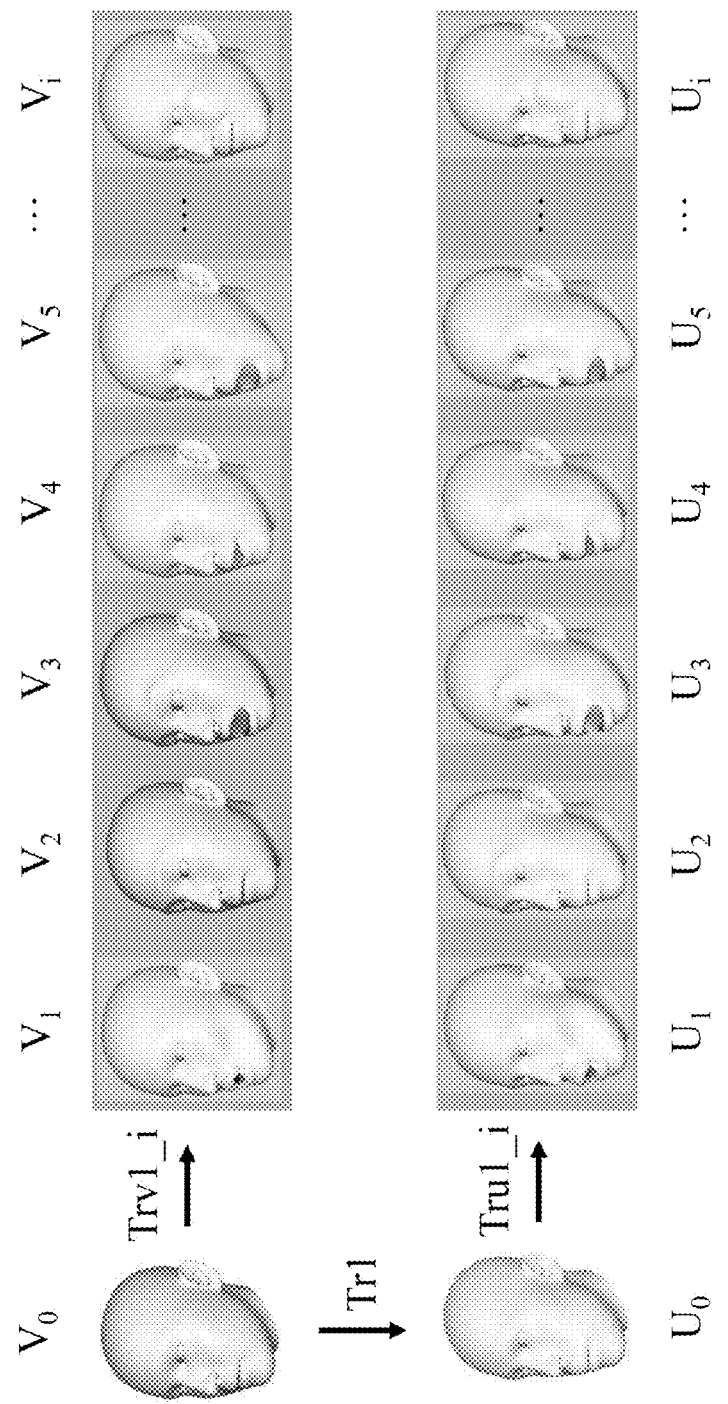
FIG. 12 illustrates an example of creating, by an avatar creation apparatus, a base object of a user avatar for each of a plurality of reference facial expressions according to an example embodiment.

FIG. 12 illustrates an example of creating, by the avatar creation apparatus 100, a base object of a user avatar for each of a plurality of reference facial expressions according to an example embodiment.

Referring to FIG. 12, the avatar creation apparatus 100 may store information on a base object of a prepared reference avatar. In FIG. 12. $V_0$ denotes the base object of the reference avatar with the default facial expression. $V_0$ may be interpreted as a vector corresponding to the base object of the reference avatar with the default facial expression. $V_i$ denotes the base object of the reference avatar with an $i^{th}$ reference facial expression. $V_i$ may be interpreted as a vector corresponding to the base object of the reference avatar with the $i^{th}$ reference facial expression. $U_0$ denotes the base object of the user avatar with the default facial expression. The user avatar may refer to an avatar customized by the user. Therefore, $U_0$ may represent a base object customized by the user. $U_0$ may be interpreted as a vector corresponding to the base object of the reference avatar with the default facial expression. $U_i$ denotes the base object of the user avatar with the $i^{th}$ reference facial expression. $U_i$ may be interpreted as a vector corresponding to the base object of the reference avatar with the $i^{th}$ reference facial expression.

In operation S162 of FIG. 11, the avatar creation apparatus 100 may extract the first transformation relationship (Tr1) between the base object of the reference avatar with the default facial expression ($V_0$) and the base object of the user avatar with the default facial expression ($U_0$). In operation S164 of FIG. 11, the avatar creation apparatus 100 may create the base object of the user avatar for each of the reference facial expressions ($U_i$) from the base object of the reference avatar set for each of reference facial expressions ($V_i$). The avatar creation apparatus 100 may create the base object of the user avatar with the $i^{th}$ reference facial expression ($V_i$) from the base object of the reference avatar with the $i^{th}$ reference facial expression ($V_i$) using the first transformation relationship Tr1. The avatar creation apparatus 100 may determine the transformation relationship (Tru1_$i$) between the base object of the user avatar with the default facial expression ($U_0$) and the base object of the user avatar with the $i^{th}$ reference facial expression ($U_i$) based on the transformation relationship (Trv1_$i$) and the first transformation relationship (Tr1) between the base object of the reference avatar with the default facial expression ($V_0$) and the base object of the reference avatar with the $i^{th}$ reference facial expression ($V_i$). The avatar creation apparatus 100 may create the base object of the user avatar with the $i^{th}$ reference facial expression ($U_i$) from the base object of the user avatar with the default facial expression ($U_0$) using the transformation relationship (Tru1_$i$).

Similar to the principle of creating the base object, the avatar creation apparatus 100 may create a partial object of the user avatar with the reference facial expression from a partial object of the reference avatar with the reference facial expression. The avatar creation apparatus 100 may extract a second transformation relationship from the partial object of the reference avatar with the default facial expression and the partial object of the user avatar with the default facial expression. The second transformation relationship may include a (2-1)-th transformation relationship for the first partial object, a (2-2)-th transformation relationship for the second partial object, and the like. The avatar creation apparatus 100 may create the partial object of the user avatar with the reference facial expression from the partial object of the reference avatar with the reference facial expression based on the second transformation relationship. The avatar creation apparatus 100 may create the user avatar that expresses a natural facial expression by combining the partial object of the user avatar that expresses the reference facial expression with the base object of the user avatar that expresses the reference facial expression. The avatar creation apparatus 100 may create the user avatar that expresses a new facial expression by projecting the partial object onto the surface of the base object or by combining the partial object with the base object such that a relative distance between the partial object and the base object is maintained.

In operation S166, the avatar creation apparatus 100 may create a facial expression of the user avatar by combining the user avatar with the default facial expression and the user avatar created for each of the reference facial expressions.

The avatar creation apparatus 100 may create the base object of the user avatar with a new facial expression (U) by combining the base object of the user avatar with the default facial expression ($U_0$) and the base object of the user avatar set for each of the reference facial expressions ($U_i$). The avatar creation apparatus 100 may determine a combination weight ($W_i$) of the base object of the user avatar set for each of the reference facial expressions ($U_i$). The avatar creation apparatus 100 may determine the combination weight ($W_i$) based on speech of the user. The avatar creation apparatus 100 may determine the combination weight ($W_i$) from the speech of the user using a pretrained artificial neural network. The combination weight ($W_i$) may represent a weight of the base object of the user avatar with the $i^{th}$ reference facial expression ($U_i$).

The base object of the user avatar with the new facial expression (U) created by the avatar creation apparatus 100 may be represented as Equation 1.

$$U = U_0 + \sum_{i=1}^{n} W_i U_i \qquad \text{[Equation 1]}$$

In Equation 1, $U_0$ denotes the base object of the user avatar with the default facial expression, $U_i$ denotes the base object of the user avatar with the $i^{th}$ reference facial expression, $W_i$ denotes the weight of $U_i$, and n denotes a total number of reference facial expressions. Although the weight of $U_0$ is normalized to 1 in Equation 1, the example embodiment is not limited thereto. For example, the weight of $U_0$ may be set to a value other than 1. Also, the combination weight $W_i$ may be determined based on the speech of the user. However, the example embodiment is not limited thereto. For example, the avatar creation apparatus 100 may determine the combination weight $W_i$ by extracting information on emotion of the user based on a captured image of the user.

The avatar creation apparatus 100 may apply the extracted combination weight set $\{W_i\}$ to partial objects as well as the base object. The avatar creation apparatus 100 may create a partial object corresponding to a new facial expression by combining the partial object of the user avatar with the default facial expression and partial objects of the user avatar with the reference facial expression using the combination weight set $\{W_i\}$.

Figure 13:
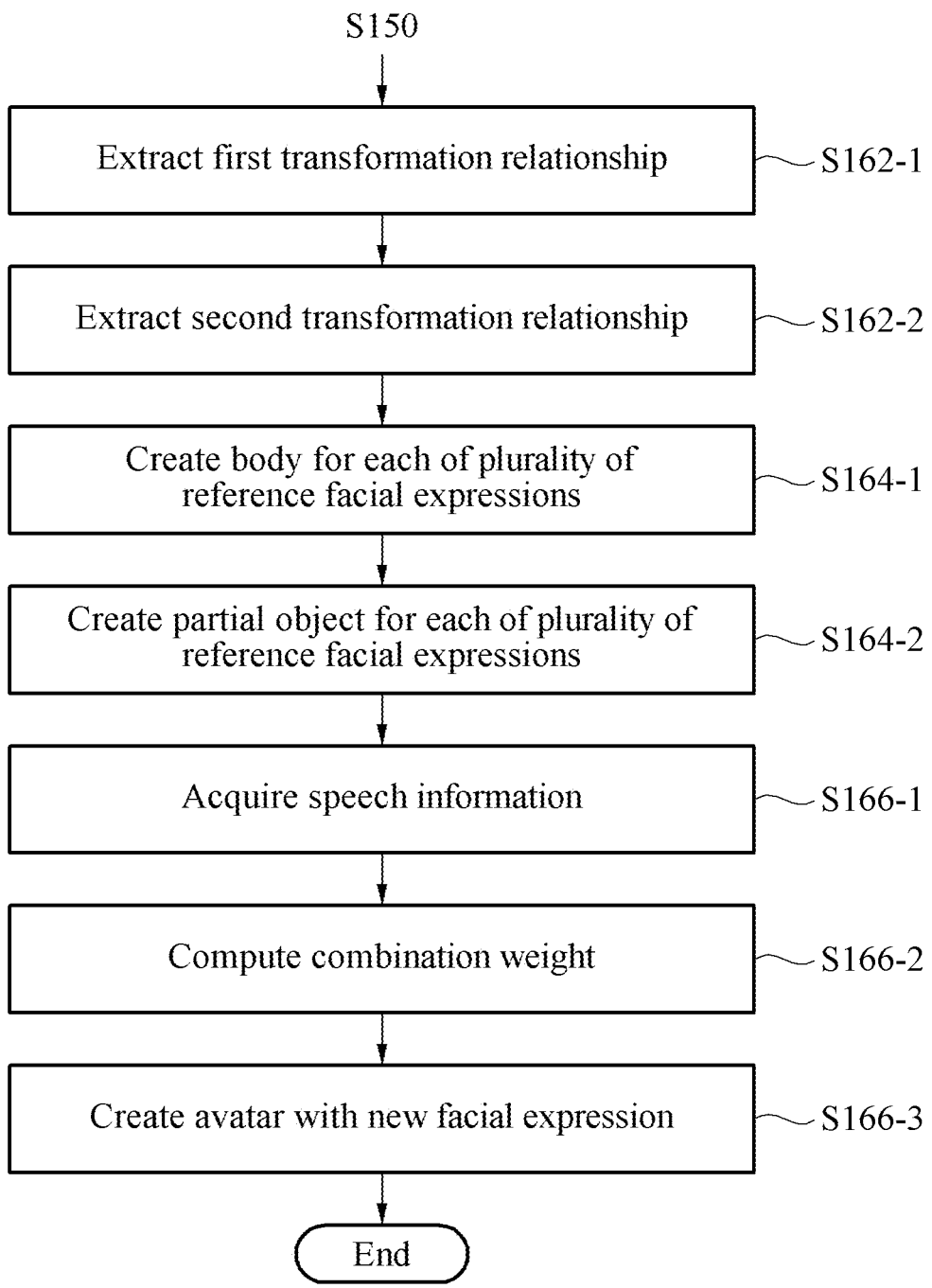
FIG. 13 is a flowchart illustrating an example of a process of performing operation S160 of FIG. 10 in detail.
Figure 14:
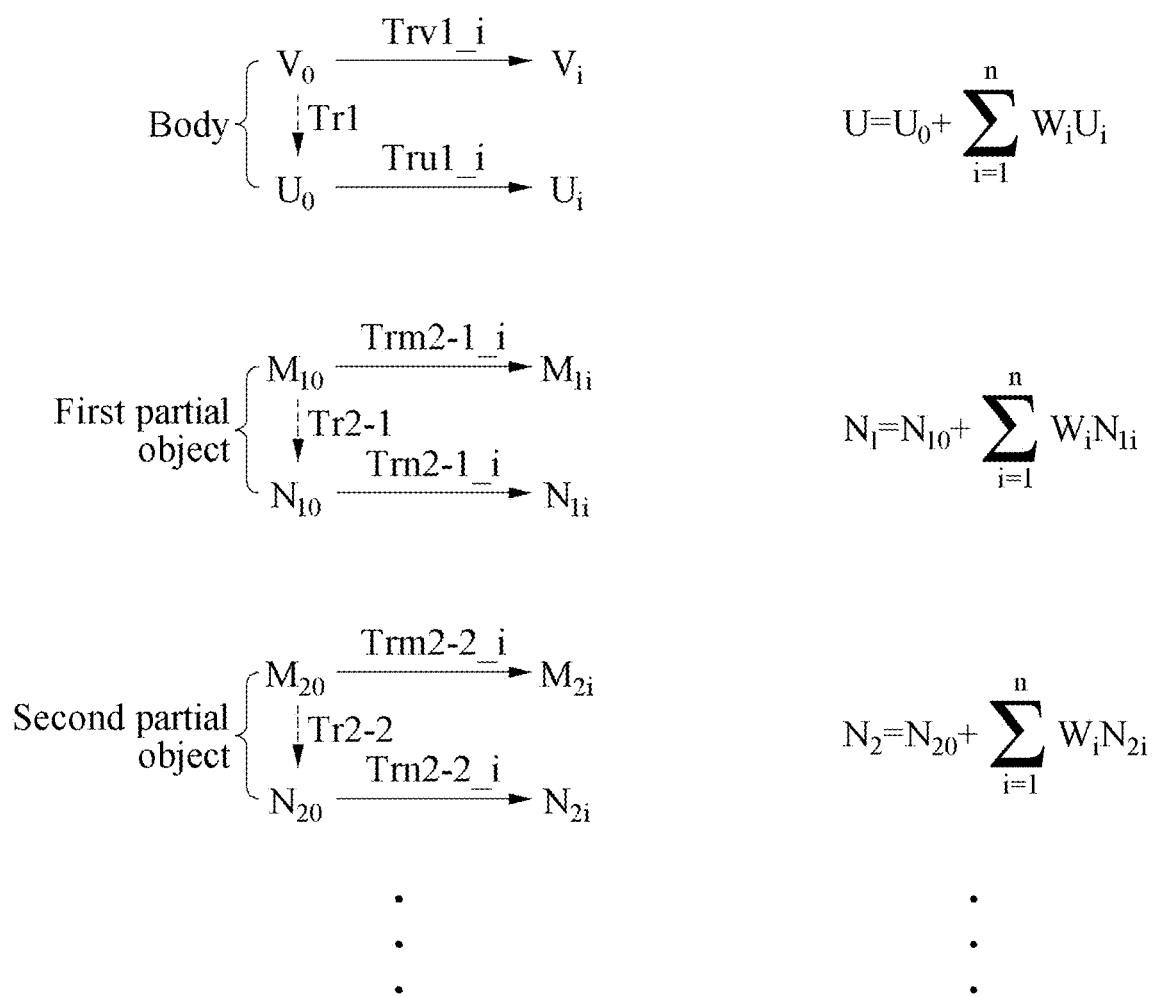
FIG. 14 illustrates an example of a process of creating a user avatar with a new facial expression according to an example embodiment.

FIG. 13 is a flowchart illustrating an example of a process of performing operation S160 of FIG. 10 in detail. FIG. 14 illustrates an example of a process of creating a user avatar with a new facial expression according to an example embodiment.

Referring to FIGS. 13 and 14, in operation S162-1, the avatar creation apparatus 100 may extract the first transformation relationship (Tr1). The avatar creation apparatus 100 may extract the first transformation relationship (Tr1) from the base object of the reference avatar with the default facial expression ($V_0$) and the base object of the user avatar with the default facial expression ($U_0$).

In operation S162-2, the avatar creation apparatus 100 may extract the second transformation relationship. The second transformation relationship may include the (2-1)-th transformation relationship (Tr2-1) for the first partial object, the (2-2)-th transformation relationship (Tr2-2) for the second partial object, and the like. For example, although the first partial object may correspond to an eye of the avatar and the second partial object may correspond to a nose of the avatar, the example embodiment is not limited thereto. A base object portion of the avatar to which a corresponding partial object corresponds may change. For example, the avatar creation apparatus 100 may extract the (2-1)-th transformation relationship (Tr2-1) based on a first partial object ($M_{10}$) of the reference avatar with the default facial expression and a first partial object ($N_{10}$) of the user avatar with the default facial expression.

In operation S164-1, the avatar creation apparatus 100 may create the base object of the user avatar corresponding to each of the plurality of reference facial expressions ($U_i$) based on the first transformation relationship (Tr1). The avatar creation apparatus 100 may determine the transformation relationship (Tru1_i) between the base object of the user avatar with the default facial expression ($U_0$) and the base object of the user avatar with the $i^{th}$ reference facial expression ($U_i$) based on the transformation relationship (Trv1_i) and the first transformation relationship (Tr1) between the base object of the reference avatar with the default facial expression ($V_0$) and the base object of the reference avatar with the $i^{th}$ reference facial expression ($V_i$). The avatar creation apparatus 100 may create the base object of the user avatar with the $i^{th}$ reference facial expression ($U_i$) from the user avatar base object ($U_0$) with the default facial expression using the transformation relationship (Tru1_i).

In operation S164-2, the avatar creation apparatus 100 may create partial objects of the user avatar corresponding to each of the plurality of reference facial expressions based on the second transformation relationship.

For example, the avatar creation apparatus 100 may create a first partial object ($N_{1i}$) of the user avatar corresponding to each of the plurality of reference facial expressions based on the (2-1)-th transformation relationship (Tr2-1). The avatar creation apparatus 100 may determine the transformation relationship (Trn2-1_i) between the first partial object ($N_{10}$) of the user avatar with the default facial expression and the first partial object ($N_{1i}$) of the user avatar with the $i^{th}$ reference facial expression based on the transformation relationship (Trm2-1_i) and the (2-1)-th transformation relationship (Tr2-1) between the first partial object ($M_{10}$) of the reference avatar with the default facial expression and the first partial object ($M_{1i}$) of the reference avatar with the $i^{th}$ reference facial expression. The avatar creation apparatus 100 may create the first partial object ($N_{1i}$) of the user avatar with the $i^{th}$ reference facial expression from the first partial object ($N_{10}$) of the user avatar with the default facial expression using the transformation relationship (Trn2-1_i).

The avatar creation apparatus 100 may create the second partial object ($N_{2i}$) of the user avatar corresponding to each of the plurality of reference facial expressions based on the (2-2)-th transformation relationship (Tr2-2). The avatar creation apparatus 100 may determine the transformation relationship (Trn2-2_i) between the second partial object ($N_{20}$) of the user avatar with the default facial expression and the second partial object ($N_{2i}$) of the user avatar with the $i^{th}$ reference facial expression based on the transformation relationship (Trm2-2_i) and the (2-2)-th transformation relationship (Tr2-2) between the second partial object ($M_{20}$) of the reference avatar with the default facial expression and the second partial object ($M_{2i}$) of the reference avatar with the $i^{th}$ reference facial expression. The avatar creation apparatus 100 may create the second partial object ($N_{2i}$) of the user avatar with the $i^{th}$ reference facial expression from the second partial object ($N_{20}$) of the user avatar with the default facial expression using the transformation relationship (Trn2-2_i).

In operation S166-1, the avatar creation apparatus 100 may acquire speech information of the user. In operation S166-2, the avatar creation apparatus 100 may determine the combination weight set $\{W_i\}$ of each of the reference facial expressions based on the speech information of the user.

Figure 15:
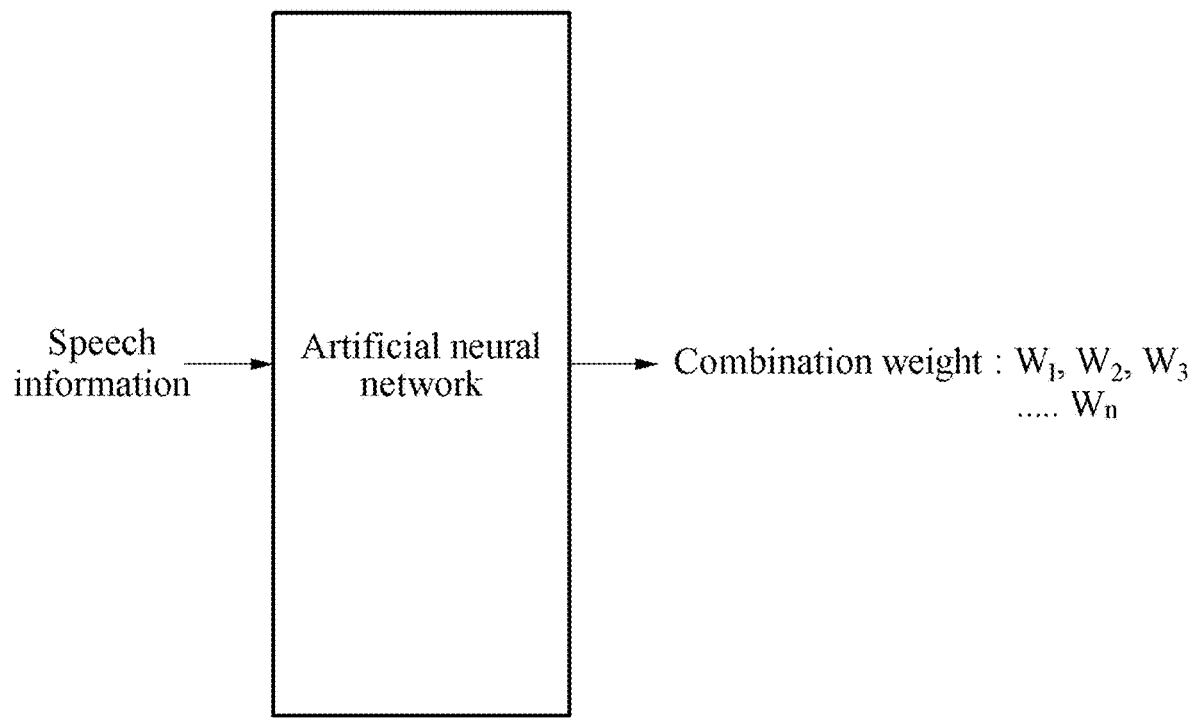
FIG. 15 illustrates an example of determining, by an avatar creation apparatus, a combination weight set based on speech information of a user according to an example embodiment.

FIG. 15 illustrates an example of determining, by the avatar creation apparatus 100, the combination weight set $\{W_i\}$ based on speech information of the user according to an example embodiment.

Referring to FIG. 15, the avatar creation apparatus 100 may determine the combination weight set $\{W_i\}$ of each of the reference facial expressions using an artificial neural network. The artificial neural network may be pretrained to receive speech information as an input and to output the combination weight set $\{W_i\}$. The artificial neural network may include a recurrent neural network (RNN), a long short term memory (LSTM), and the like, but the example embodiment is not limited thereto.

Referring again to FIGS. 13 and 14, the avatar creation apparatus 100 may create the avatar with a new facial expression in operation S166-3. The avatar creation apparatus 100 may create the user avatar with a different facial expression at each of a plurality of points in times and may create an avatar animation. The avatar creation apparatus 100 may create the base object of the user avatar with the new facial expression (U) by combining the base object of the user avatar with the default facial expression ($U_0$) and the base object of the user avatar with the reference facial expression ($U_i$) based on the combination weight set $\{W_i\}$. In a similar manner, the avatar creation apparatus 100 may create the first partial object ($N_1$) with the new facial expression and the second partial object ($N_2$) with the new facial expression. As described above, since the avatar creation apparatus 100 may create each of the base object with the new facial expression and the partial objects with the new facial expression based on the combination weight set $\{W_i\}$ of the reference facial expression, the facial expression of the user avatar may be diversified. Also, the facial expression of the user avatar may be more naturally simulated.

The speech information acquired in operation S166-1 may include a time-series speech sequence. In this case, the avatar creation apparatus 100 may create a time-series weight sequence corresponding to the time-series speech sequence. The avatar creation apparatus 100 may create the user avatar with a different facial expression at each point in time from the time-series weight sequence. The avatar creation apparatus 100 may animate the user avatar using graphics of the user avatar created at each of a plurality of points in times.

Figure 16:
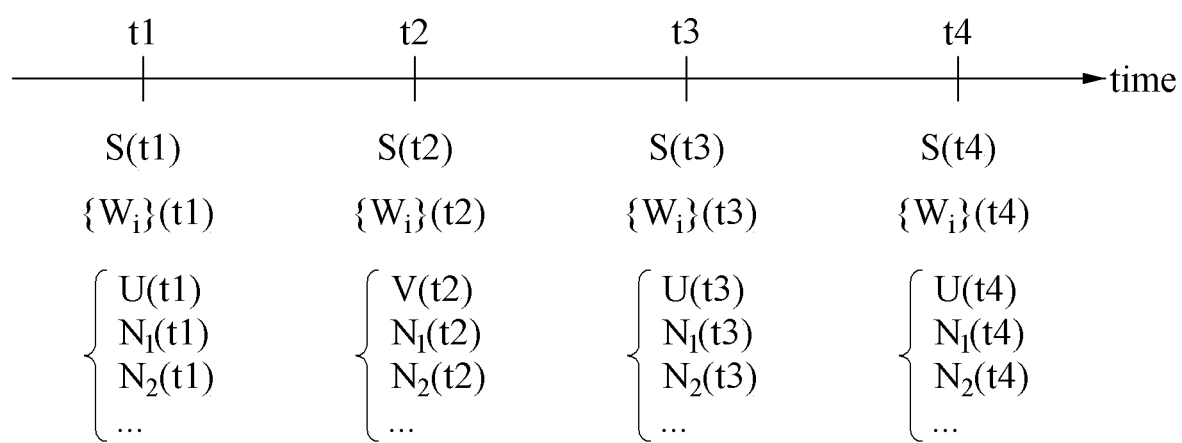
FIG. 16 illustrates an example of animating, by an avatar creation apparatus, a user avatar according to an example embodiment.

FIG. 16 illustrates an example of animating, by the avatar creation apparatus 100, a user avatar according to an example embodiment.

Referring to FIG. 16, the speech information may include a speech sequence. The avatar creation apparatus 100 may determine a combination weight set $\{W_i\}$ (tn) from speech information S(tn) of an $n^{th}$ point in time tn. The avatar creation apparatus 100 may determine a base object of the user avatar, a first partial object $N_1$(tn) of the user avatar, and a second partial object $N_2$(tn) of the user avatar at a point in time tn from the combination weight set $\{W_i\}$(tn).

The avatar creation apparatus 100 may project partial objects created at the respective points in time onto the base object. The avatar creation apparatus 100 may create the user avatar with a different facial expression at each point in time.

The avatar creation apparatus and method according to example embodiments are described with reference to FIGS. 1 to 16. The user avatar created according to the example embodiments may be converted to 3D printing data and used. The user avatar may be produced and sold as 3D data and also as a physical product based on the 3D data.

The methods according to the example embodiments may be implemented in a form of program instructions executable through various computer methods and may be recorded in computer-readable recording media. The media may include, alone or in combination with program instructions, data files, data structures, and the like. The program instructions recorded in the media may be specially designed and configured or may be known to those skilled in the computer software art and thereby available.

Examples of the media may include a hardware device specially designed to store and perform a program instruction, such as read only memory (ROM), random access memory (RAM), flash memory, and the like. Examples of the program instruction may include a machine language code as produced by a compiler and a high language code executable by a computer using an interpreter. The aforementioned hardware device may be configured to operate as at least one software module to perform operations of the example embodiments, or vice versa.

Also, the method or the apparatus may be implemented by combining all of or some of components or functions thereof or may be implemented separated.

Although the example embodiments are described above, those skilled in the art will understand that various modifications and alterations may be made to the example embodiments without departing from the spirit and the scope of the disclosure set forth in the claims.

What is claimed is:

1. An avatar creation method comprising:
creating a base object of an avatar;
creating at least one partial object;
acquiring customizing information of a user;
deforming the base object and the at least one partial object based on the customizing information;
creating a user avatar with a default facial expression by projecting the at least one partial object onto the surface of the base object; and
changing a facial expression of the user avatar,
wherein the changing the facial expression of the user avatar comprises:
extracting a transformation relationship between the user avatar with the default facial expression and a prepared reference avatar with a default facial expression;
creating the user avatar for each of a plurality of reference facial expressions from the reference avatar prepared for each of the plurality of reference facial expressions based on the transformation relationship; and
changing the facial expression of the user avatar by combining the user avatar with the default facial expression and the user avatar created for each of the plurality of reference facial expressions.

2. The avatar creation method of claim 1, wherein the deforming the base object and the at least one partial object comprises:
deforming information of the base object included in a grid space through deformation of at least one of a plurality of grid spaces that constitutes the base object based on first customizing information on the base object; and
deforming information of the at least one partial object included in a grid space through deformation of at least one of a plurality of grid spaces that constitutes the at least one partial object based on second customizing information on the at least one partial object.

3. The avatar creation method of claim 2, wherein the deforming the base object and the at least one partial object further comprises changing at least one of a thickness, a color, a texture, and smoothing of the at least one partial object based on the second customizing information on the at least one partial object.

4. The avatar creation method of claim 2, wherein a change in a location of a vertex associated with configuration information of the base object accompanies deformation of a partial object associated with the vertex of which the location is changed.

5. The avatar creation method of claim 2, wherein deformation of at least one of the plurality of grid spaces that constitutes the base object accompanies deformation of a grid space of a partial object associated with the deformation of the grid space of the base object such that the base object and the partial object are deformed together.

6. The avatar creation method of claim 1, wherein the at least one partial object is projected onto the surface of the base object in a predetermined one direction.

7. The avatar creation method of claim 1, wherein the at least one partial object is projected in a normal vector direction of the surface of the base object at a location at which the at least one partial object is projected onto the surface of the base object.

8. The avatar creation method of claim 1, further comprising:
acquiring a captured face image of the user,
wherein the base object and the at least one partial object of the avatar are created based on feature information acquired from the captured face image of the user.

9. The avatar creation method of claim 8, wherein the feature information acquired from the captured face image of the user includes at least one of a face shape of the user, a skin tone of the user, a hair style of the user, a hair color of the user, an eye size of the user, an eye color of the user, gender of the user, age of the user, a type and a shape of accessory, and a racial characteristic of the user.

10. The avatar creation method of claim 1, wherein the extracting the transformation relationship comprises:
extracting a first transformation relationship between a base object of the user avatar and a base object of the reference avatar from the default facial expression; and
extracting a second transformation relationship between at least one partial object of the user avatar and a partial object of the reference avatar from the default facial expression, and the creating the user avatar for each of the plurality of reference facial expressions comprises:
creating the base object of the user avatar for each of the plurality of reference facial expressions from the base object of the reference avatar prepared for each of the plurality of reference facial expressions based on the first transformation relationship; and
creating the partial object of the user avatar for each of the plurality of reference facial expressions from the base object of the reference avatar prepared for each of the plurality of reference facial expressions based on the second transformation relationship.

11. The avatar creation method of claim 1, wherein the changing the facial expression of the user avatar comprises:
acquiring speech information of the user;
determining a combination weight of each of the plurality of reference facial expressions based on the speech information of the user; and
combining the user avatar with the default facial expression and the user avatar created for each of the plurality of reference facial expressions based on the combination weight.

12. The avatar creation method of claim 11, wherein a combination weight of the user avatar created for each of the plurality of reference facial expressions is expressed as a time-series weight sequence, and
a facial expression of the user avatar is animated based on the time-series weight sequence.

13. The avatar creation method of claim 1, further comprising:
providing the user avatar as three-dimensional (3D) printing data.

14. An avatar creation apparatus comprising:
at least one processor,
wherein the at least one processor is configured to perform a process of creating a base object of an avatar; a process of creating at least one partial object; a process of acquiring customizing information of a user; a process of deforming the base object and the at least one partial object based on the customizing information; a process of creating a user avatar with a default facial expression by projecting the at least one partial object onto the surface of the base object; and a process of changing a facial expression of the user avatar,
wherein the process of changing the facial expression of the user avatar comprises:
a process of extracting a transformation relationship between the user avatar with the default facial expression and a prepared reference avatar with a default facial expression;
a process of creating the user avatar for each of a plurality of reference facial expressions from the reference avatar prepared for each of the plurality of reference facial expressions based on the transformation relationship; and
a process of changing the facial expression of the user avatar by combining the user avatar with the default facial expression and the user avatar created for each of the plurality of reference facial expressions.

* * * * *